United States Patent [19]

Cornish

[11] Patent Number: 5,047,962

[45] Date of Patent: Sep. 10, 1991

[54] EVENT OCCURRENCE TIME AND FREQUENCY DETECTION AND RECORDING APPARATUS

[76] Inventor: John Cornish, 32819 Jefferson, St. Clair Shores, Mich. 48082

[21] Appl. No.: 202,498

[22] Filed: Jun. 6, 1988

[51] Int. Cl.[5] .......... G06F 15/20

[52] U.S. Cl. .......... 364/550; 364/556; 340/934; 377/6

[58] Field of Search .......... 364/442, 550, 556; 340/674, 934; 434/129; 446/491; 377/6, 26

[56] References Cited

U.S. PATENT DOCUMENTS

| | | | |
|---|---|---|---|
| 4,127,766 | 11/1978 | Thayer | 340/674 |
| 4,201,908 | 5/1980 | Johnson et al. | 235/92 TC |
| 4,258,421 | 3/1981 | Juhasz et al. | 364/442 |
| 4,258,430 | 3/1981 | Tyburski | 364/900 |
| 4,271,512 | 6/1981 | Lyhus | 371/21 |
| 4,356,387 | 10/1982 | Tsubota et al. | 235/92 |
| 4,400,783 | 8/1983 | Locke, Jr. et al. | 364/550 |
| 4,528,679 | 7/1985 | Shahbaz et al. | 377/6 |

OTHER PUBLICATIONS

Advertising Literature, of Trailmaster, Shawnee, Kans., showing "Infra-Red Game Counter/Timer".

*Primary Examiner*—Parshotam S. Lall
*Assistant Examiner*—V. Trans
*Attorney, Agent, or Firm*—Basile and Hanlon

[57] ABSTRACT

An apparatus for detecting and recording the time and frequency of occurrence of events at a predetermined surveillance site includes a sensor providing successive output signals corresponding to successive detections of an event occurrence at the surveillance site. The output signals from the sensor are input to a central processing unit operating a control program stored in a memory which stores in the memory the date, time and number of occurrences of events at the surveillance site. The apparatus also includes a keyboard for inputting start date and start time information and for initiating the operation of sensing of events and the recall of stored date, time and event occurrence number information for display on a digital display mounted on the apparatus. All of the operative components of the apparatus are powered by a d.c. electric power source and are contained in a waterproof housing mountable at a predetermined surveillance site.

4 Claims, 5 Drawing Sheets

EVENT OCCURRENCE TIME AND FREQUENCY DETECTION AND RECORDING APPARATUS

BACKGROUND OF THE INVENTION

1. Field of the Invention

The present invention relates, in general, to measuring and recording apparatus and, more specifically, to apparatus for detecting and recording the occurrence of events at a surveillance site.

2. Description of the Prior Art

Various types of counting and recording devices have been devised to detect and count the occurrence of events at a predetermined site or location. Particularly, such counter and recording devices have been utilized as vehicle traffic counters or for counting passengers boarding or exiting from vehicles, such as busses, etc.

Such recording devices employ a sensor for detecting the passage of an object past a surveillance point. Infrared, photoelectric and ultrasonic sensors have been employed to detect the movement of persons past the surveillance point and pneumatic air tubes have been employed in vehicle traffic counters. The output of the sensor is input to a counter which provide a total count of event occurances at the surveillance site. The accumulated count data is then subsequently processed in various ways for display and/or analysis.

Some of the known event counting and recording devices incorporate elaborate and complex circuitry to detect the direction of movement of objects past the surveillance point and the start or completion of the event. While providing an accurate count of event occurrences, such circuits increase the cost and size of such counting and recording devices.

In tracking wild animals, such as deer or bear, for hunting and other purposes, it is desirable to know when an animal passes a predetermined location. While the above-described counting and recording devices could be employed for this purpose, their size and weight limits their portability which is important in tracking wild animals which require such devices to be carried a considerable distance into woods or fields. Further, the devices utilizing alternating current electrical power are not usable at all to track animals in the wild and those employing direct current electric power from internal storage batteries have had a short, useful operative surveillance period due to the high power drain imposed by the complex circuitry used in such devices. Finally, the known counting and recording devices provide only a total count of the number of event occurrences at the surveillance site without any reference to the time or date of such event occurrences.

It is known that large animals, such as deer or bear, generally follow a fixed pattern or path of movement in the wild on a cyclic basis over a one to three day period in which a single animal will pass certain locations at the same time of day in each cycle while feeding, resting, etc. Thus, to successfully locate such animals, it is necessary to determine the time that an animal passes a predetermined point or location and not just a count of the number of animals which pass the point or location.

A known timing device for determining the time that an animal passes a predetermined location utilizes a digital timer activated by a string tautly placed across the expected path of the animal. The animal passing the timer trips the string which stops the timer. The digital display on the timer provides an indication of the time when the animal has passed the monitored point or location. However, this timing device is utilized for a single, one time operation and provides no indication of the time of passage of subsequent animals past the surveillance point.

Thus, it would be desirable to provide an event occurrence detection and recording apparatus which provides a time indication of the frequency of occurrence of events at a predetermined surveillance point or location. It would also be desirable to provide an event occurrence detection and recording apparatus which indicates the time and number of occurrences of events at a predetermined surveillance location. It would also be desirable to provide an event occurrence detection and recording apparatus which indicates the time and number of event occurrences at a surveillance site over a long time interval, such as several days. It would also be desirable to provide an event occurrence detection and recording apparatus which is small, compact and lightweight for easy portability. It would also be desirable to provide an event occurrence detection and recording apparatus which utilizes an internal power source enabling the use of the apparatus in remote areas, such as fields and woods. Finally, it would also be desirable to provide an event occurrence detection and recording apparatus which possesses low electrical power requirements so as to enable its use over a long time period.

SUMMARY OF THE INVENTION

The present invention is an apparatus for detecting and recording the time and frequency of event occurrences at a predetermined surveillance site. The apparatus includes a central processing means or unit operating a control program. Sensor means, input to the central processing means, senses the occurrence of an event at the surveillance site within the field of view of the sensor means and provides an output signal for each successive event occurrence. A memory means is coupled to the central processing means for data and control program storage. A clock is also coupled to the central processing means to provide continuous clock pulses to operate the central processing means and provide discrete time increments. Input means, in the form of a multi push button keyboard is coupled to the central processing means for inputting start date and start time data and for initiating the recall of stored data from the memory. Finally, a display means is coupled to the central processing means for displaying the date, time and number of event occurrences sensed by the sensor means in a predetermined time period.

The central processing means is responsive to the stored control program and to the input of start date and start time data from the keyboard means and stores the start date and start time data in the memory. The central processing means is also responsive to the occurrence of an event as indicated by an output signal from the sensor means to store in the memory the date and time at which the event occurred. Finally, the central processing means is responsive to the keyboard for recalling from the memory and successively outputting to the display the date and time of the occurrence of events at the surveillance site for visual display.

Preferably, the central processing means establishes successive time periods, each of a predetermined time increment, starting from the initial start date and start time. The central processing means in response to the occurrence of an event sensed by the sensor stores in the memory the date and start time of the time period in which at least one event occurred as well as the total number of event occurrences within the time period in which at least one event occurred. Upon recall of the data, only the date and start time of time periods in which at least one event occurred are successively displayed along with the number of event occurrences within each time period in which at least one event occurred.

In a preferred embodiment, a direct current electrical power source is utilized for supplying direct current power to the apparatus. Preferably, the electrical power source is in the form of d.c. storage batteries mounted in a weatherproof housing along with the sensor, central processing means, memory, clock, input keyboard and display.

The unique event occurrence time and frequency detection and recording apparatus of the present invention uniquely provides a visual display of the time and occurrence of events at a predetermined surveillance site which is extremely useful in determining the time and frequency of animal passage past a predetermined surveillance site. The apparatus is constructed as a compact, lightweight assembly in a single weatherproof housing for ease of portability into the woods or fields. By utilizing a d.c. electrical power source housed internally within the housing, the apparatus exhibits a long term single application time use which enables it to be deployed in a sensing mode over a long period of time, such as several days or weeks.

Further, by utilizing circuitry requiring low power requirements and by recording data corresponding to the date, time and number of event occurrences only in time periods when at least one event occurrence has been detected by the sensor, the useful life of the power source is extended making it more adaptable and useful for placement in woods or fields for long periods of time. Finally, by providing an indication of the date, time and frequency of event occurrence, particularly for an animal passing a predetermined location, the apparatus of the present invention is a useful aid for a hunter in locating a wild animal by determining its cyclic feeding, resting and travel pattern.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
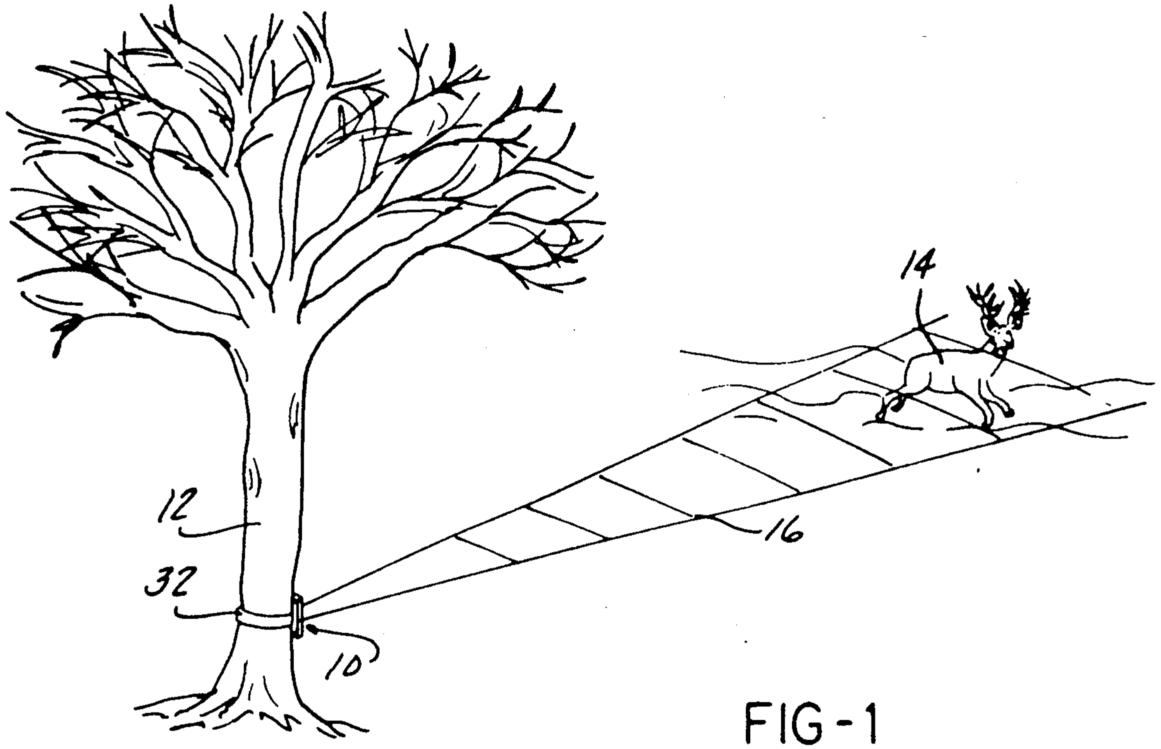
FIG. 1 is a pictorial representation of the use of the event occurrence time and frequency detection and recording apparatus of the present invention.

Throughout the following description and drawing, an identical reference number is used to refer to the same component shown in multiple figures of the drawing.

Referring now to the drawing, and to FIG. 1 in particular, there is illustrated an event occurrence time and frequency detection and recording apparatus 10 particularly suited for detecting and recording the date, time and frequency of the passage of animals, such as deer or bear, past a predetermined surveillance point or location. The apparatus 10 may be mounted at any suitable location associated with the movement of an object, such as an animal. Particularly, the apparatus 10 is suited for mounting on a support surface, such as a tree 12, to detect the passage of an animal 14 through the field of view 16 of the apparatus 10.

Figure 3:
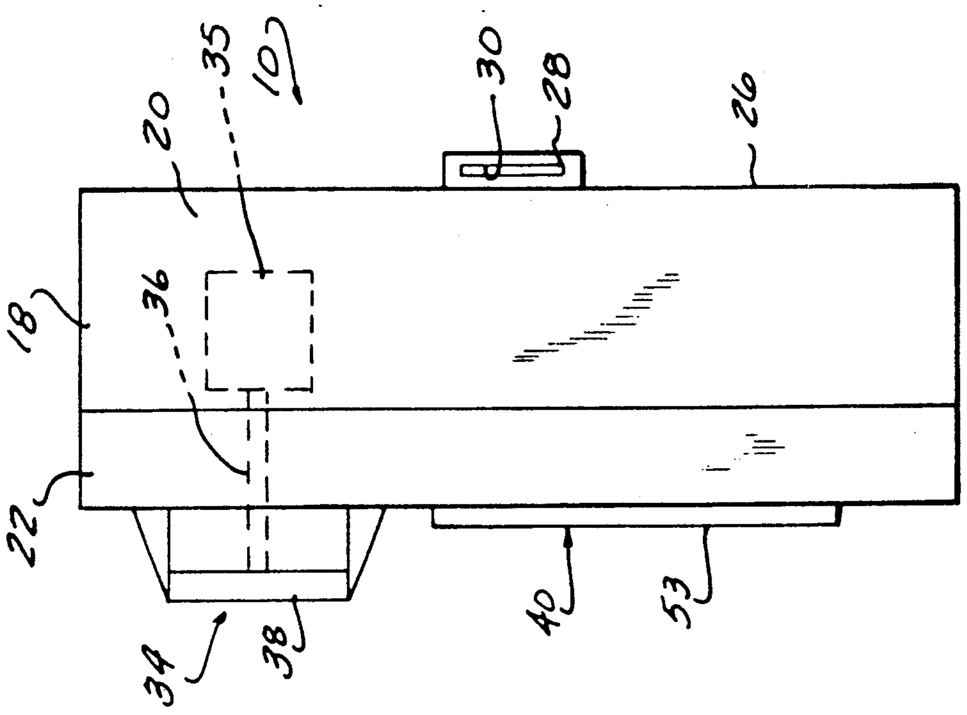
FIG. 3 is a side view of the apparatus shown in FIG. 2.
Figure 2:
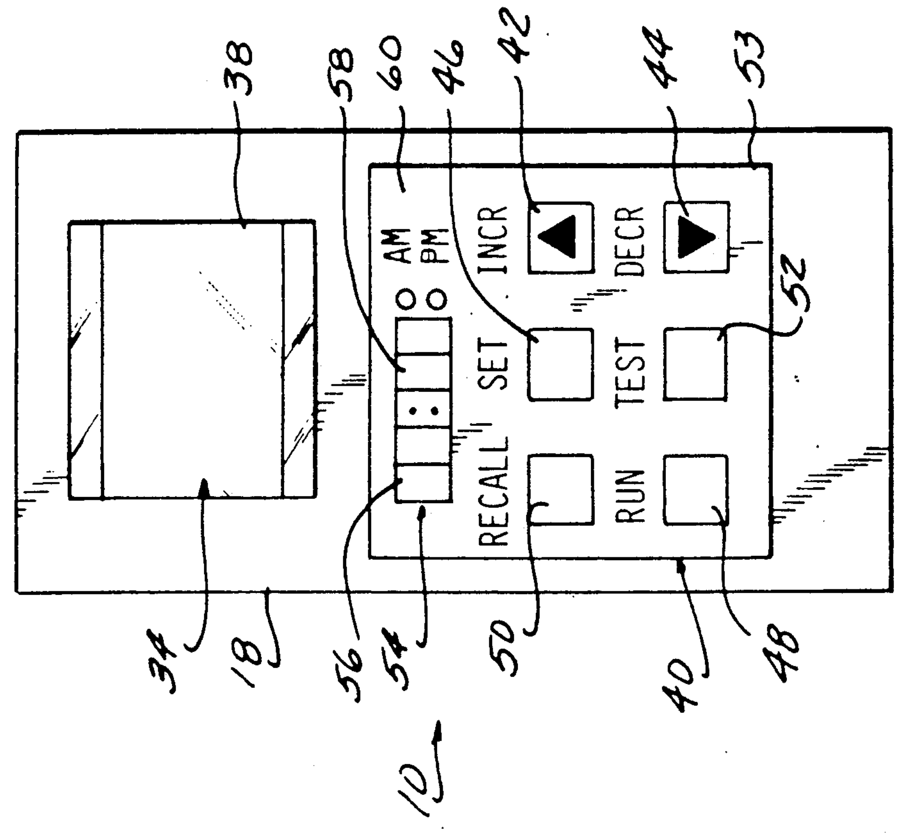
FIG. 2 is a front view of the apparatus shown in FIG. 1.

As shown in FIGS. 1, 2 and 3, the apparatus 10 includes a housing 18 in the form of an openable enclosure. The housing 18 may be formed of any suitable material, such as metal or plastic, and is constructed in a weatherproof manner to protect the internal components from external environmental or ambient conditions. Particularly, the housing 18 is suitable for use in an outdoor environment and is constructed to protect the internal components from heat and cold as well as moisture.

The enclosure 18, by way of example only, has a substantially rectangular form constructed of a hollow base portion 20 and a front cover portion 22. The front cover portion 22 is attached to the base 20 in any suitable manner such as by mounting screws, a snap together fit or by means of a hinge. The base portion 20 as well as the cover portion 22 are hollow to provide a suitable mounting space for the components described hereafter.

As shown in FIGS. 1 and 3, the back surface 26 of the base portion 20 of the enclosure 18 includes mounting means 28 for mounting the housing 18 to a suitable support surface, such as a tree 12. The mounting means 28, by way of example only, is formed of a loop integrally formed as part of the base 20 or attached thereto. The loop 28 includes an aperture 30 for receiving a mounting strap or tie 32 therethrough for securely mounting the apparatus 10 to a support surface.

The apparatus 10 includes sensor means denoted in general by reference number 34 which senses the occurrence of an event, such as the passage of an animal 14, at the surveillance site in the field of view 16 of the sensor means 34.

Any type of sensor 34 may be employed in the apparatus 10 of the present invention which is suitable for detecting the movement or passage of an animal 14 through the field of view 16 of the sensor 34. The sensor 34 should be responsive to a physical stimulus, such as heat, light, sound, pressure, magnetism or motion within its field of view 16.

In a preferred embodiment, although a conventional infrared sensor is employed in the apparatus 10, it will be understood that other types of sensors, such as ultrasonic, photoelectric, microwave, etc., all of which are well known, may also be employed as the sensor 34.

The main sensing unit 35 of the sensor means 34 is mounted within the interior of the enclosure 18 and generates an output sensing beam 36 which is directed towards a window 38 mounted on the front cover portion 22 of the enclosure 18. The window 38 acts as a diverging lens and is illustrated as having a parabolic shape in FIG. 3. The window or lens 38 causes divergence of the output sensing beam 36 from the sensor unit 35 into the desired field of view pattern. As is well known, the field of view may have any shape depending upon the type of window or lens 38 utilized with the sensor 35. Thus, although the parabolic window or lens 38 shown in FIG. 3 has been chosen to generate a substantially planar, pie-shaped sector field of view 16 as shown in FIG. 1, other shaped fields of view may also be provided, such as conical, cylindrical, cubical, etc., by merely varying the configuration of the window 38.

In the illustrated example of the sensor 34, the field of view 16 afforded by the sensor 34 is substantially planar in form so that when the apparatus 10 is mounted a short distance, such as several feet, above ground level small animals may pass underneath the field of view 16 and not be detected thereby, and the generation of an output signal by the sensor 34 occurs only when a larger animal, such as a deer or bear, passes through the field of view 16 of the sensor 34.

As shown in FIG. 2, input means denoted in general by reference number 40 is mounted on the front cover portion 22 of the enclosure 18 of the apparatus 10. The input means 40 preferably comprises a keyboard formed of a plurality of push buttons or depressible keys 42, 44, 46, 48, 50 and 52. Each of the keyboard push buttons or keys may be individually sealed with respect to the external environment or, as shown in FIGS. 2 and 3, the push buttons may be covered by a single, weatherproof flexible membrane 53 which is mounted at its peripheral edges to the front portion 22 of the enclosure 18.

The push buttons 42, 44, 46, 48, and 50 initiate various functions used to input start date and start time data to generate a test sequence, to initiate the detection and recording operation of the apparatus 10 and to initiate the recall of stored data from the apparatus 10 as described in greater detail hereafter. Thus, push button 42 is designated as an increment input and push button 44 is used as a decrement input to increase and decrease, respectively, the date and time numerals.

Push button 46 is a set function to set or enter each inputted date and time value. Push button 48 represents a "run" function to initiate the start of detection and recording; while push button 50 is a "recall" function to recall stored data from memory. The sixth push button 52 initiates a test sequence to check the mounting position of the apparatus 10.

The apparatus 10 also includes a display 54 for displaying date and time information as well as the number of event occurrences. The display 54 may be any type of visual display, such as an LED or LCD display. The display 54 includes a plurality of numeric segments each assigned to specific functions. In a preferred embodiment, the display 54 includes two, two digit displays 56 and 58 and individual LED's 60 and 62 labeled "AM" and "PM" respectively.

It should be understood that the number of individual elements forming each designated display unit 56 and 58 is by way of example only as the configuration of the display 54 may be modified to conform to any specific application, such as one indicating only time and number of occurrences, for example.

The two digit display segment 56 is used to display month and hour information; while the two digit display segment 58 is utilized to display day, minutes and number of occurrances data during data entry as well as data recall as described hereafter. As shown in FIG. 2, the display means 54 is disposed behind the sealed membrane 53 mounted on the front cover portion 22 of the enclosure 18 to enable the display digits to be visible from the front of the enclosure 18.

Figure 4:
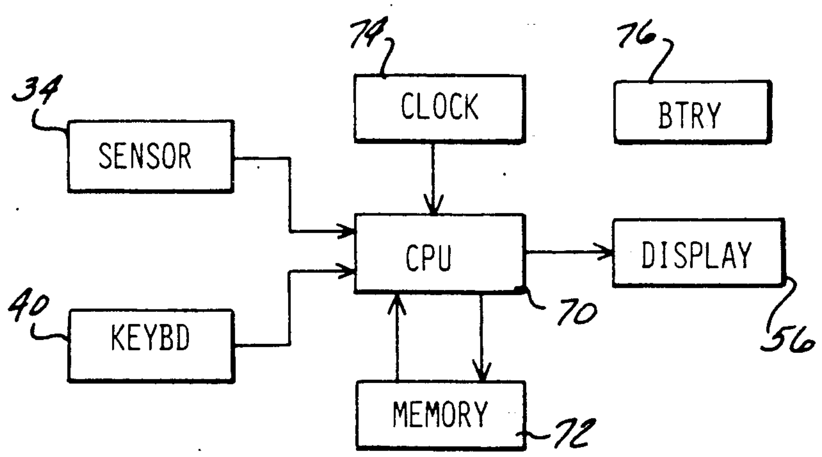
FIG. 4 is a block diagram depicting the interconnection of the components of the apparatus of the present invention.

Referring now to FIG. 4, there is illustrated a block diagram of the circuitry employed in the detection and recording apparatus 10. The apparatus 10 includes a central processing means, such as a central processing unit 70. Preferably, the central processing unit 70 is formed of any conventional microprocessor which operates a stored control program.

Memory means 72 is disposed in data communication with the central processing means or unit 70. The memory 72 serves as storage for the control program used to control the operation of the central processing unit 70 as well as data storage as described hereafter.

The memory 72 may be in any conventional form which includes a number of separately addressable memory locations. Thus, either random access, ROM, PROM or EAPROM memory may be utilized. A permanent or semi-permanent memory may be employed to store the control program used to operate the central processing unit 70; while a random access memory is desired for use as data storage. Both memory sections in either permanent or randomly accessible memory elements form the memory means 72 of the present invention.

A clock 74 is connected to the central processing unit 70 and provides timing pulses to clock or sequence the central processing unit 70 through the control program and to control signal flow between the various elements of the apparatus 10. The clock 74 also provides time increments which are used by the central processing unit 70 to establish date and time periods for recording or counting the number of events within each time period as described in greater detail hereafter.

A battery 76 shown generally in FIG. 4 is connected to all of the operative elements of the apparatus 10 and provides suitable electric power thereto. Preferably, the battery 72 provides d.c. electric power to the apparatus 10 to enable the use of the apparatus 10 in a remote area, such as the fields or woods, far from a source of ac electric power. This eliminates the needs for a transformer to convert ac power to the dc power required to run the electronic components forming the apparatus 10 of the present invention. The battery 76 may be formed of conventional d.c. storage batteries of either a replaceable or rechargeable type as desired.

As shown in FIG. 4, the output from the sensor means 34 and the output from the keyboard input means 40 are input to the central processing unit 70. It should be noted that, although not shown, any necessary signal processing circuitry required to provide the low level d.c. input signal to the central processing unit 70 from the sensor 34 may be employed in the circuit as well.

The output from the central processing unit 70 is to the display 54. Normally, during the detecting and recording mode of operation, the display 54 is blank to minimize power utilization from the power source 76.

In operating the apparatus 10 to detect and record the occurrence of events at a surveillance site, initially, the start date and start time are entered into the apparatus 10. The memory 72 is devoid of data at the first operation of the apparatus 10. As described in greater detail hereafter, the memory information is deleted after completing a complete data recall sequence under the operation of the control program stored in the memory 72 and executed by the central processing unit 70.

Figure 5:
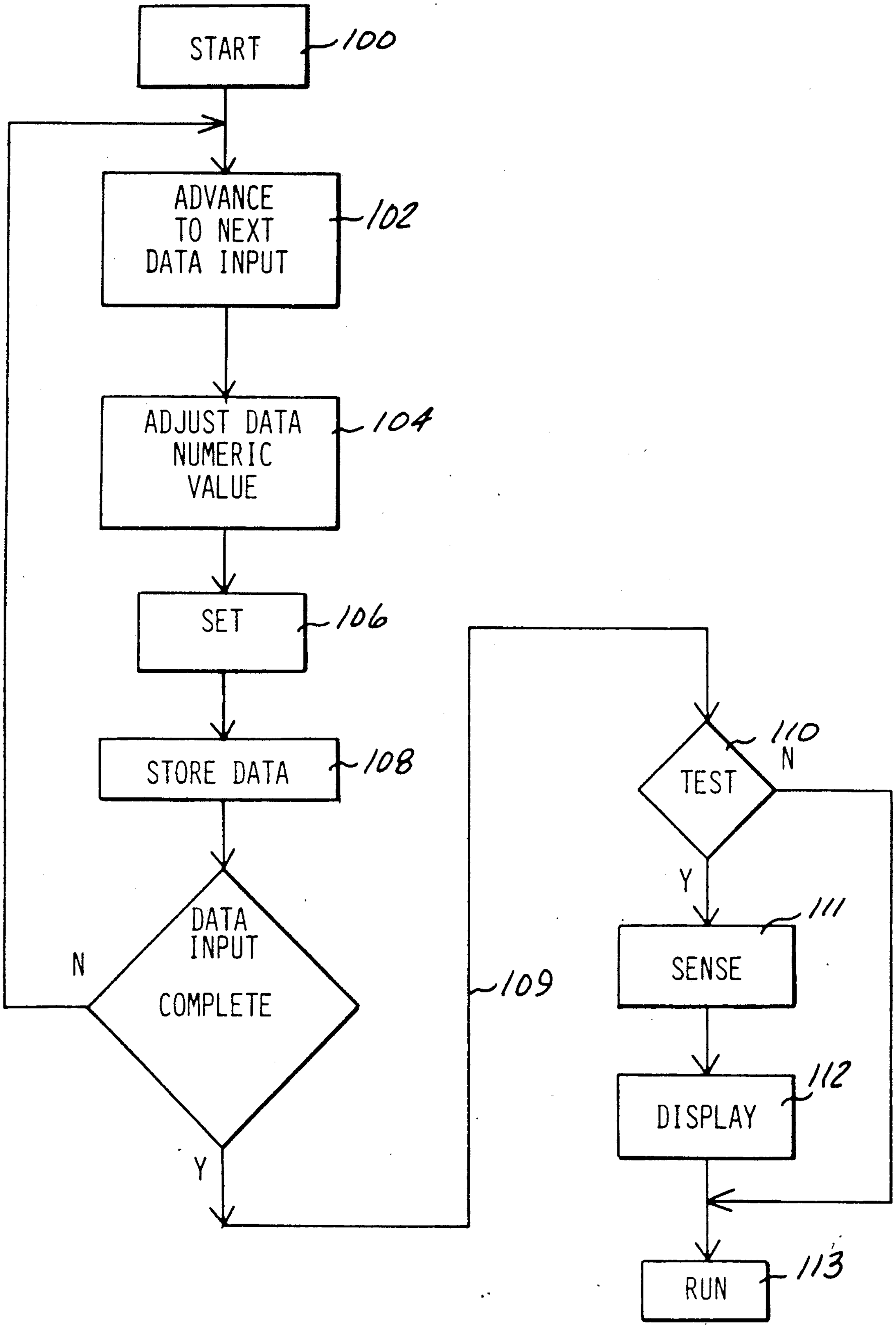
FIG. 5 is a flow diagram depicting the operation of the control program in loading start date and start time data into the apparatus of the present invention.
Figure 6:
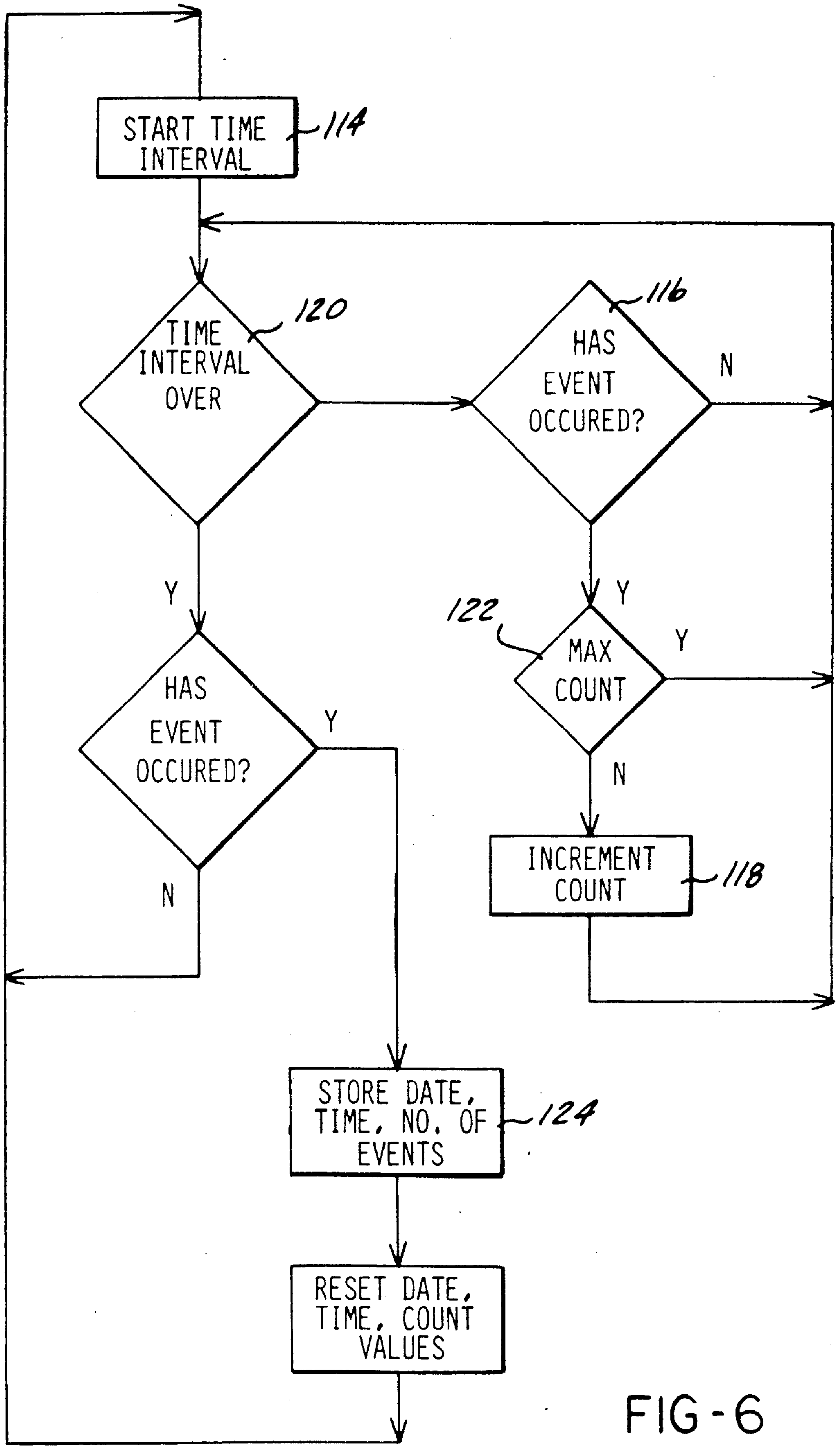
FIG. 6 is a flow diagram depicting the operation of the control program in counting and storing date, time and number of occurrances data.
Figure 7:
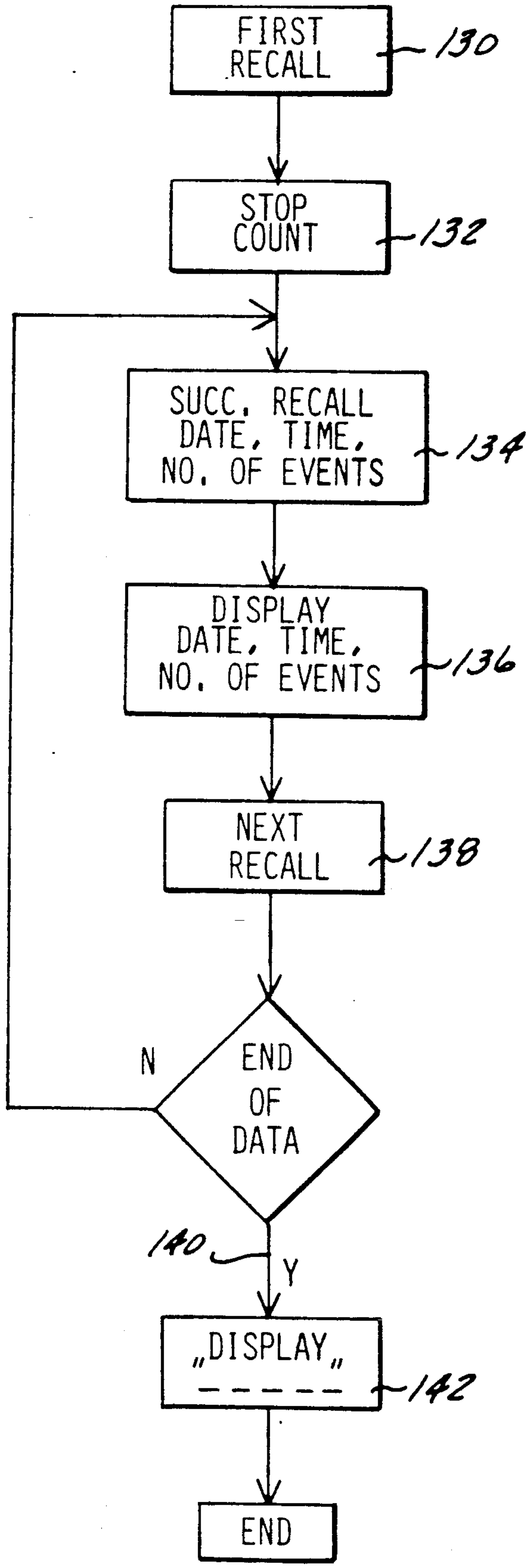
FIG. 7 is a flow diagram depicting the operation of the control program in recalling and displaying data from the memory.

It should be noted that the sequence of operation of the apparatus 10 as described hereafter is embodied in a suitable control program written in a computer language which is within the knowledge of those skilled in the art of utilizing microprocessors and computers. Such a program can be developed to operate the central processing unit 70 and the apparatus 10 in the sequence described hereafter and depicted in FIGS. 5, 6 and 7.

The control program operates to sequence the loading of date and time information into the memory 72 and to display the entered data on the display means 54 before storage in the memory 72 in sequence starting with the month and continuing through the day, hour and minute. Thus, the control program at the initiation of a data load sequence, step 100, FIG. 5, first sequences to receive current month information in step 102. This is accomplished by depressing and holding depressed either of the increment or decrement push buttons 42 or 44, step 104, which sequence the display segment 56 at the rate of the clock 74 until the desired numeric number representing the current month is displayed in the display segment 56 shown in FIG. 2. The operator then presses the "set" push button 46, step 106, to permanently store in the memory 72, step 108, the desired month information shown on the display 56.

After the "set" push button 46 has been depressed, the control program advances to load in the next data information, such as the date, as displayed on the display segment 58. Again, the increment and decrement push buttons 42 and 44, step 104, are utilized as necessary to set the digits on the display 58 to the current day and, when the "set" push button 46, step 106, is depressed again, to transfer such information to the memory 72.

Similar steps utilizing the increment and decrement push buttons 42 and 44 and the "set" push button 46 are used to load in start time hour and minute information which is displayed on the display segments 56 and 58, respectively, until the "set" push button 46 is depressed and the information is loaded into the memory 72. It should be noted that during the input of hour information as shown on the display segment 56, the "AM" or "PM" lights 60 or 62 will be illuminated to designate each applicable twelve hour segment of time.

Once the start date and time information has been stored in the memory 72, step 109, the apparatus 10 may be mounted in the desired location or surveillance site by the mounting straps 32 to detect the occurrence of event, such as the passage of an animal 14, through the field of view 16 of the sensor 34 which faces outward from the front portion 22 of the enclosure 18 of the apparatus 10. When the apparatus 10 is in the desired position, the operator depresses the "run" push button 48, step 113, to begin the detection and recording period, step 114, FIG. 6. Optionally, prior to depressing the "run" push button 48 to begin the detection and recording operation of the apparatus 10, the user may desire to initially test the mounting of the apparatus 10 for a proper positioning of the field of view 16 of the sensor means 34. Depressing the "test" push button 52 initiates the test sequence and activates the sensor means 34 to generate outputs upon detecting movement within the field of view 16 of the sensing means 34, as shown in step 111 in FIG. 5. The sensor means 34 generates an output upon detecting each event occurrance, such as the movement of an object within the field of view 16, which, through the central processing unit, is displayed on the display means 54, step 112, as a series of hyphens in each display element. The "hyphens" will be displayed indicating the detection of an event within the field of view 16 and may be utilized by the user of the apparatus 10 to insure that the apparatus 10 is mounted in a level position and at the desired height above ground level so as to place the field of view 16 in an optimum position for detecting the movement of animals past the surveillance site. The display means 54 is visible over the entire field of view 16 of the sensor means 34. Thus, the user may stand at the peripheral edges of the field of view 16 and determine whether his presence is detected by the sensor means 34 so as to determine the proper positioning of the apparatus 10. Upon completion of the test sequence, the user depresses the "run" push button 48, step 113, to begin the detection and recording sequence shown in FIG. 6.

Upon detecting the occurrence of an event, step 116, such as a single passage of an animal 14 through the field of view 16 of the sensor 34, the sensor 34 outputs a signal indicating such event occurrence. This output signal is input to the central processing unit 70 which initiates a count sequence, step 118, to record the current date and time of the event occurrance. This information is subsequently transferred from the central processing unit 70 to the memory 72 for storage.

While it is possible to utilize the apparatus 10 to record the date and time of each occurrence of an event within the field of view 16 of the sensor means 34, it has been found that due to the susceptibility of animals 14 to linger in a particular spot for a considerable length of time during which the animal 14 passes repeatedly in and out of the field of view 16 of the sensor 34 generating repeated output signals indicating separate event occurrences and, further, since it is only necessary for the apparatus 10 to give a time and frequency indication and not the exact number of event occurrences, considerable electrical power could be saved thereby prolonging the useful life of the power source 76 by recording only date and time information for selected time periods during the overall single time recording use of the apparatus 10. The time periods may be provided with any time increment, such as fifteen minutes in a preferred embodiment of the present invention. The central processing unit 70 in response to successive clock pulses from the clock 74 generates successive fifteen minute time periods or intervals, step 120. However, no data is stored in the memory 72 until at least one event has occurred and been detected by the sensor 34 within a particular time period.

When at least one event, such as an animal passing through the field of view 16 of the sensor 34, has occurred, the central processing unit 70 records the current date and start time of the time period during which at least one event occurred. The central processing unit 70 also counts, step 118, the number of successive output signals from the sensor 34 indicating repeated event occurrences within that particular time period. In order to minimize power usage and memory utilization, a limit is set for the maximum number of counts within each time period. The limit or maximum count may be any numeric value, such as fifteen, for each separate time period. Counting is inhibited when the maximum count is reached until the next time period begins, step 122.

Thus, for example, if an animal 14 passes through the field of view 16 of the sensor 34 for the first time, the central processing unit 70 will initiate the counting sequence, step 118, to record additional event occurrences upon each successive movement of the animal 14 through the field of view 16 of the sensor 34. The CPU 70 stores the date (month and day) and start time (hours and minutes) of the time period when the first event was detected, such as, for example, 05 15 10:30A in the memory 72, step 124. The count, such as 12, is also recorded for the number of event occurrences within the particular fifteen minute time interval during which at least one event occurred. If the animal 14 is still moving in and out of the field of view 16 of the sensor 34 during the next fifteen minute interval, the central processing unit 70 will then initiate a subsequent count period and transfer at the end of the subsequent time interval the date and time, such as 05 15 10:45A and the number of events detected during the second time period, such as 7, as for example, to the memory 72, step 124.

It should be understood that when no events are occurring, the central processing unit 70 continues to process clock pulses and generates successive time intervals, step 120, although no data transfer to the memory 72 takes place until an event actually occurs.

At any time, the user may decide to retrieve the data stored in the memory 72 to determine the time and frequency of animal passages or event occurrences at the surveillance site. In so doing, the user depresses the recall push button 50 for the first time, step 130, FIG. 7, which stops the count sequence, step 132, and causes the central processing unit 70 to recall, step 134, from the memory 72 the data for the first time period or interval during which an event occurred and was detected by the sensor 34. This information is displayed in the display means 54, step 136, until the user depresses the recall button 50 again, step 138.

In displaying the data, the date information in the form of month and day is first displayed on the display segments 56 and 58 until the user depresses the recall push button 50 again. Next, the time information in the form of hours and minutes is displayed on the display segments 56 and 58, respectively, until the recall push button 50 is again depressed. Finally, the number of occurrances within a particular time interval is displayed on the display segment 58. Upon the next depression of the recall push button 50, the central processing unit 70 retrieves from the memory 72, in step 134, the data corresponding to the next time period during which an event occurred. This process is repeated until all the data stored in the memory 72 has been retrieved and successively displayed on the display 54, step 140. This information can be analyzed by the user to determine the time and frequency of animal passages at the surveillance site to determine the time and frequency of the animal in the area of the surveillance site to aid in tracking or hunting the animal.

After the number of occurrances for the last time interval in which an event occurrance was detected and recorded by the apparatus 10 has been displayed and the recall push button 50 depressed, the display means 54 will display a series of hyphens, step 142, indicating the end of recorded events. This terminates the recall operation in the apparatus 10.

In summary, there has been disclosed an apparatus useful for detecting and determining the time and frequency patterns of animals passing a predetermined surveillance site. The detection and recording apparatus is light in weight and compact so as to be easily portable over considerable distances through woods and fields. The apparatus employs a dc electric power source in the form of dc storage batteries which also contributes to the portability of the unit and its use in remote areas as well as providing a long useful detecting life, such as one or more days or weeks. Further, the data relating to date, time and number of event occurrences over a predetermined time period can be easily retrieved and displayed to determine the time and frequency patterns of animal passages at the surveillance site.

What is claimed is:

1. An apparatus for detecting and recording the time and frequency of the presence of an animal at a surveillance site comprising:

a weatherproof housing;

an electric power source mounted in the housing for supplying electric power to the apparatus;

a central processing means mounted in the housing and operating a control program;

infrared sensor means, mounted in the housing and having a field of view in the form of a planar pie-shaped sector extending radially outward from the housing and input to the central processing means, for sensing the presence of an animal at the surveillance site within the entire field of view of the sensor means;

memory means, mounted in the housing and coupled to the central processing means, for data and control program storage;

a clock mounted in the housing and coupled to the central processing means, the clock providing continuous clock pulses;

display means, mounted in the housing and coupled to the central processing means, for displaying the date, time and number of separate presences of an animal sensed by the sensor means in a predetermined time period; and the central processing means being responsive to the control program and to the input of start date and start time data from the input means for storing the start date and start time data in the memory means, and responsive to the presence of an animal sensed by the sensor means to store in the memory means the data and time of the detected presence of an animal and responsive to the input means for recalling from the memory means and sucessively outputting to the display means for visual display the data and time of the detected presence of an animal at the surveillance site;

wherein said central processing means establishes sucessive time periods, each having a predetermined time interval, starting from the initial start date and start time of detecting and recording and said central processing means includes means responsive only the presence of an animal sensed by the sensor means for storing in the memory means the date and start time of only the time period in which at least one animal was detected.

2. The apparatus of claim 1 wherein:

the central processing means also stores in the memory means the number of occurrences of sensed animal presences at the surveillance site in each time period.

3. The apparatus of claim 1 wherein the electric power source comprises d.c. electric storage batteries.

4. An apparatus for detecting and recording the time and frequency of the presence of an animal at the surveillance site comprising:

a weatherproof housing;

a d.c. electric power source mounted within the housing;

central processing means mounted within the housing and powered by the d.c. electric power source and operating a control program;

infrared sensor means, mounted in the housing and having a field of view of a predetermined space adjacent to the sensor means and extending outward from the housing, and input to the central processing means, for sensing the presence of an animal at the surveillance site within the entire field of view of the sensor means;

memory means, mounted in the housing and coupled to the central processing means, for data and control program storage;

a clock mounted in the housing and coupled to the central processing means, the clock providing continuous clock pulses;

input means, mounted in the housing and coupled to the central processing means, for inputting start date and start time data and for initiating a recall of stored data; and display means, mounted in the housing and coupled to the central processing means, for displaying the date, time and number of separate presences of an animal sensed by the sensor means in a predetermined time period;

the central processing means being responsive to the control program and to the input of start date and start time data from the input means for storing the initial start date and start time in the memory means, the central processing means including means, responsive to the clock means and the initial start date and start time, for establishing successive time periods, each having a predetermined time interval, from the initial start date and start time of detecting and recording, the central processing means including means, responsive only to the presence of an animal sensed by the sensor means for storing in the memory means the date and start time of only the time period in which at least one animal was detected and the number of occurrences of detected animal presences in each such time period, and responsive to the input means for recalling from the memory means and successively outputting to the display means for visual display the date and the start time of the time periods and the number of occurrences of detection of the presence of an animal at the surveillance site in each time period.

* * * * *